United States Patent [19]

Stol

[11] Patent Number: 4,580,026

[45] Date of Patent: Apr. 1, 1986

[54] METHOD AND APPARATUS FOR CONTROLLING THE TEMPERATURE OF CONTINUOUSLY FED WIRES

[75] Inventor: Israel Stol, Pittsburgh, Pa.

[73] Assignee: Westinghouse Electric Corp., Pittsburgh, Pa.

[21] Appl. No.: 741,422

[22] Filed: Jun. 5, 1985

[51] Int. Cl.[4] .............................................. B23K 9/12
[52] U.S. Cl. ................. 219/136; 219/137.2; 219/137.71
[58] Field of Search ................ 219/136, 137.2, 137.71, 219/137 R, 130.21, 137 PS

[56] References Cited

U.S. PATENT DOCUMENTS

| 4,283,617 | 8/1981 | Merrick et al. | 219/137.2 |
| 4,456,814 | 6/1984 | Mizuno et al. | 219/137.71 |
| 4,467,176 | 8/1984 | Mizuno et al. | 219/137.71 |

Primary Examiner—Clifford C. Shaw
Attorney, Agent, or Firm—Thomas R. Trempus

[57] ABSTRACT

The invention provides an apparatus and a method for controlling the thermal state of a welding wire which is continuously fed and heated between two electric contact tips having a dielectric gap of a predetermined length therebetween. Heating is effected by passing an electric current between the two contact tips and through the wire. The method of this invention comprises the steps of characterizing the welding wire by establishing a preheating current versus wire feed rate relationship, predetermining the average temperature of the outcoming wire at known preheating currents and known wire feed rates, and establishing a series of temperature isotherms based at least in part on the aforedescribed relationship between heating current and wire feed rate. The apparatus includes a pre-programmed computer system which coordinates the wire feed rate and preheating power application to the cold wire according to the method of this invention.

4 Claims, 13 Drawing Figures

METHOD AND APPARATUS FOR CONTROLLING THE TEMPERATURE OF CONTINUOUSLY FED WIRES

BACKGROUND OF THE INVENTION

This invention relates to arc welding, cladding and brazing in general, and more particularly the present invention is directed to a process for controlling the temperature of continuously fed wires in such operations and an apparatus whereby the aforesaid process can be operationalized.

In conventional gas-metal arc welding (GMAW) processes, heating of the alloyed wire prior to deposition is accomplished by passing welding current through a certain wire length, commonly referred to as the wire stick-out. The power consumed in heating this wire is equal to the product of the square of the welding current and the resistance of the wire. In order to increase the wire deposition rate, the heat content of the wire is increased by increasing the electrical stick-out or the welding current or both.

Excessive wire stick-out leads to uncontrolled wire wandering and/or poor deposit quality. Therefore, welding current is the predominant variable that determines deposition rate and the mode of metal transfer through the arc. However, current intensification leads to more power dissipation in the arc. Since approximately 65 to 85% of the arc heat is conducted into the metal base, a higher current would increase arc penetration while increasing deposition rate and decreasing dilution. Although dilution can be reduced by employing higher welding current and slower speeds of travel, these means of control have practical limitations. Higher heat input per unit of length can generate excessive assembly distortion and metallurgical damage in both the deposit and the base metal, such as heat affected zone (HAZ) underbed cracking and hot cracking.

In the conventional hot wire gas-tungsten arc welding (HWGTAW) process, heating of the alloyed wire prior to deposition is accomplished by passing heating current through a certain length of wire stick-out. As in the GMAW process, higher wire heat content is adjusted by increasing wire stick-out or increasing heating current or both. This makes the HWGTAW process subject to similar difficulties experienced by the GMAW process.

My U.S. Pat. No. 4,447,703 entitled "Method and Apparatus for Arc Welding" which is assigned to the assignee of the present invention and incorporated herein by reference, teaches a technique whereby a consumable wire electrode is heated prior to insertion into the electrode stick-out region. This is accomplished by the circulation of current from a preheating power supply through a segment of the wire. Based on the teachings of the aforementioned patent, there is provided auxiliary in-line $I^2R$ heating of the filler wire by adding an extra power supply and contact tip. This technique enables the substantial reduction of stick-out and enhanced positioning accuracy compared to conventional GMAW processes. For any given feed rate and length of wire (i.e., the distance, l, between the electric contact tips, the rigidity of the wire is inversely proportional to the current ($I_p$) passing through it). The region enclosed by the "red" and "cherry-red" points corresponds to the softened condition of the wire. At this state, due to the lower strength and rigidity of the wire, frequent wire feed difficulties are most likely to develop. Obviously, this region must be avoided, wire preheating must be kept below the "red" state.

A simple and apparent way to prevent "wire-jamming" difficulties is to incorporate a monitor which continuously monitors the actual wire feed rate. Such monitoring enables one to "gate" the "safe" wire feed rate, so that the preheating conditions are maintained within safe limits. Thus, for example, if the wire feed rate was set to run at 300 inches per minute and preheat ($I_p$) at 150 amperes, the wire feed monitor could be "gated" to turn off the welding operation if the wire feed rate suddenly dropped to, for example, 150 inches per minute. This turn-off feature would protect the system from "severe" wire "jam-ups". While this is a simple and apparent technique to prevent the wire jamming difficulties described above, there are certain disadvantages with "gating" the wire feed rate so that the preheating conditions are maintained within safe limits. Such disadvantages include: (1) depriving the preheating system of the flexibility to self-correct (i.e., self-adjust) the preheating conditions, to variations in the wire feed rate. In other words, due to the method's "rigidity", the system will unnecessarily be turned off more frequently than a self-adjusting method. Unless absolutely stopped, very erratic or drastically changed, most variations in wire feed should be accommodated without turning off the whole operation; and (2) this method does not control the thermal state of the wire even when it is fed within the safe gated range. If the wire feed rate varies from the one set, there is nothing to compensate and readjust the temperature of the wire at the new wire feed rate. Specifically, if the wire feed rate was lowered, but still within a safe range, and the preheating current ($I_p$) did not change, the temperature of the wire will increase.

It is, therefore, an object of the present invention to provide a technique for algorithmically controlling temperatures of continuously fed wires, in order to eliminate substantially all the drawbacks associated with gating the wire feed rate.

It is a further object of this invention to provide a technique which will furnish a self-adjusting wire preheating system that maintains its desired temperature at any feed rate.

SUMMARY OF THE INVENTION

The invention provides an apparatus and a method for controlling the thermal state of a welding wire which is continuously fed and heated between two electric contact tips having a dielectric gap of a predetermined length therebetween. Heating is effected by passing an electric current between the two contact tips and through the wire. The method of this invention comprises the steps of characterizing the welding wire by establishing a preheating current versus wire feed rate relationship, predetermining the average temperature of the outcoming wire at known preheating currents and known wire feed rates, and establishing a series of temperature isotherms based at least in part on the aforedescribed relationship between heating current and wire feed rate.

BRIEF DESCRIPTION OF THE DRAWINGS

The above as well as other features and advantages of the present invention becomes apparent through consideration of the detailed description of the invention in conjunction with the several drawings in which.

DETAILED DESCRIPTION OF THE INVENTION

Figure 2:
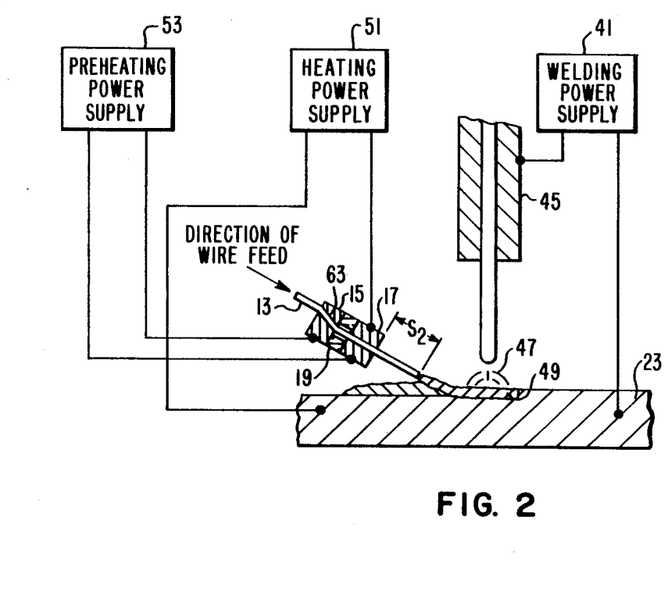
FIG. 2 shows an embodiment of a gas-tungsten arc welding apparatus for use in accordance with the present invention.
Figure 3:
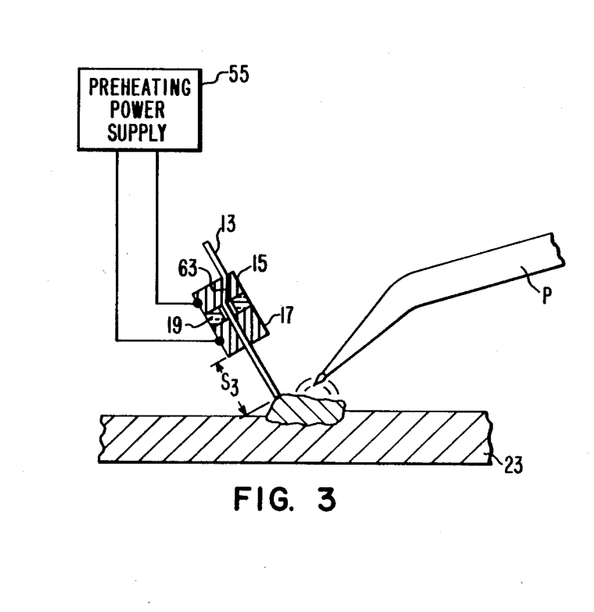
FIGS. 3A and 3B shows a resistive preheating apparatus for a continuously fed wire to a laser metal joining operations (i.e., welding, cladding, surfacing, etc.) for use according to this invnetion.

In order to fully appreciate the functional advantages obtained by the unique wire temperature controlling technique of this invention, it is advantageous to first consider the several welding techniques in which this invention can be employed. It will, of course, be obvious to the practitioners skilled in the art that the electrode configurations described herein can be incorporated into any hot wire welding, cladding, brazing and/or surfacing processes and are not to be limited to the techniques described herein. The several examples set forth in FIGS. 1, 2 and 3 are presented as exemplars only and are not to be construed as limiting the scope of implementation of this invention.

Figure 1:
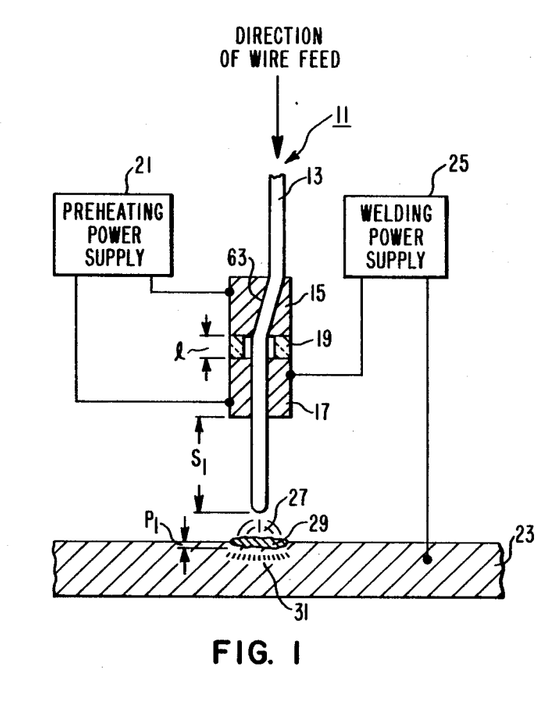
FIG. 1 shows an embodiment of a gas-metal arc welding apparatus for use in accordance with the present invention.

FIG. 1 illustrates a gas-metal arc welding apparatus generally indicated by the reference character 11. A consumable electrode 13 is provided by a feed means which will be described in detail in connection with FIG. 5 hereinafter and is conveyed in the direction indicated by the arrow. The consumable electrode wire 13 is in contact with a first electrode contact tip 15 and a second electrode contact tip 17 having a dielectric member 19 disposed therebetween. A wire preheating power supply 21 is connected between electrode contact tips 15 and 17. When consumable electrode 13 is fed toward the workpiece 23 and makes contact with contact tips 15 and 17, current flows through the segment of the electrode located between these contact tips thereby preheating the electrode before it reaches the stick-out region $S_1$. It is specifically to the preheating of this electrode that the present invention is directed. Additional heating occurs in the stick-out region due to the welding current passing through the electrode. A direct current welding power supply 25 is connected between the workpiece 23 and the electrode contact tip 17. As the consumable electrode 13 approaches the workpiece 23, an arc 27 is created and deposition of consumable electrode 13 begins. The penetration of weld 29 into workpiece 23 is that area designated as $P_1$. The use of preheating wire supply 21 reduces the welding current needed to reach a given electrode temperature. In addition, the stick-out length is reduced, thereby providing greater control of electrode position.

The use of this preheating step in the gas-metal arc welding process reduces the arc force and penetration, thereby reducing metallurgical damage and distortion of the weld assembly. Penetration $P_1$ and percent dilution are reduced while the range of controllable deposition rates increases. As a result, larger diameter wires can be used to achieve enhanced deposition rates and to maintain wire rigidity with a smaller increase in welding current than required by prior-art techniques.

Moreover, preheating the wire segment would also tend to bake out part of the volatile contaminants adhering to the wire's surface, such as moisture and drawing compounds. This occurs away from the gas shielding cone, thus reducing the potential disruption of arc stability and the solution of detrimental constituents, such as hydrogen by the molten pool. Preheating also promotes readier transfer to the spray metal transfer mode and reduces spatter. The use of multiple preheated wires can result in a high productivity cladding process.

FIG. 2 illustrates a gas-tungsten arc welding apparatus utilizing the electrode contact tips of this invention. A direct current welding power supply 41 is connected to a non-consumable electrode 43 via an electrode contact tip 45 and a workpiece 23. An arc 47 between electrode 43 and workpiece 23 creates a molten pool of metal 49 on the surface of workpiece 23. Heating power supply 51 is connected between electrode contact tip 17 and the workpiece 23. When the consumable electrode 13 is fed into the molten pool 49 while maintaining contact with electrode contact tip 17, current flows through stick-out segment $S_2$, thereby heating further consumable electrode 13. A preheating power supply 53 is connected to electrode contact tips 15 and 17 which are separated by a dielectric material 19. When consumable electrode 13 makes contact with electrode contact tips 15 and 17, current flows through the segment of the consumable electrode located between these contact tips, thereby preheating the electrode before it reaches the stick-out region $S_2$. The use of a preheating step in this process allows for shorter wire stick-out and enhanced wire rigidity at any given deposition rate, thereby providing a broadened range of deposition rates. Shorter wire stick-out and enhanced rigidity also make position adjustment, wire wandering and wire straightening less critical. In most cases, wire preheating power supply 53 can be used without power supply 51. Preheating power supply 53 can utilize alternating, continuous direct, or pulsed direct current to supply the required wire heating. The technique by which this power supply is controlled and the wire is fed to the workpiece will be described in detail hereinafter in conjunction with FIG. 5. Since the preheating current flows remotely from the molten pool 49 and welding arc 47, its magnitude has no effect on electromagnetic arc deflection. This preheating step also provides the advantage that allows with low electrical resistivities, such as copper or aluminum, can be deposited by the hot wire GTAW process. With the conventional hot wire gas-tungsten arc welding process, these alloys cannot be welded because of the high AC heating current required. These currents cause intense electromagnetic arc deflection.

Figure 3B:
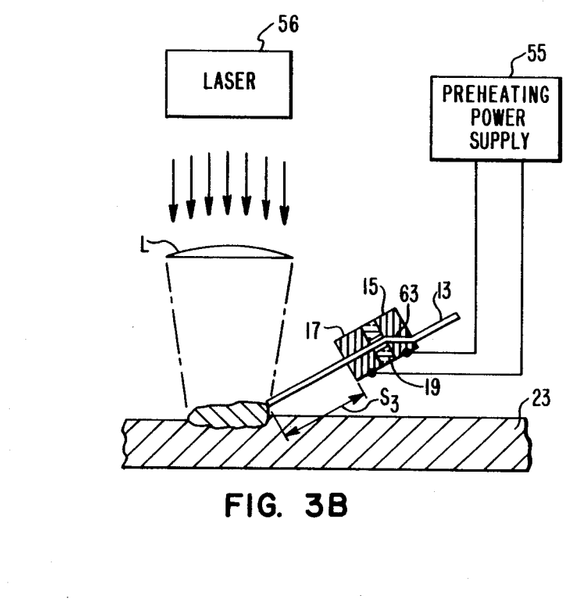

The preheating of the electrode as generally described above can be incorporated into brazing operations as well as, for example, laser welding techniques. As can be seen in FIG. 3, all that is required is that the consumable electrode 13 be conveyed through a pair of electrode contact tips 15 and 17 to which a preheating power supply 55 is electrically connected. A stick-out region $S_3$ of the preheated wire 13 is brought in proximity with the workpiece 23 at which point the desired process can be effected. The technique illustrated in FIG. 3 represents the use of an independent heat source P. By way of further example, on the one hand, a laser which would be focused through a lens "L" as shown in FIG. 3B, or parabolic mirror, oscillated with a mechanical mirror oscillator or integrated with a beam-integrator can be used as a heat source. Another technique could incorporate multiple wire feeds directed to a central point at which the welding operation could be effected.

Considering FIGS. 1 through 3, it can be seen that the upper electrode electrode contact tip 15 and the lower electrode contact tip 17 are so configured to provide consistent preheating of the consumable electrode by passing current between the lower electrode contact tip and the upper electrode contact tip. The dielectric tip 19 provides a sacrificial material which protects the internal structure of a welding torch which is not shown herein, from either melting locally and/or becoming mechanically damaged by wire jam-ups resulting from wire hesitation or wire overheating and collapsing. Moreover, the dielectric tip 19 provides a "sleeve" which collects substantially all of the contaminants such as drawing compounds and shavings which originate from the wire surface. As will be more readily appreciated hereinafter, the bore of the dielectric tip 19, although overenlarged by comparison to the consumable electrode's diameter, still provides a significant level of support to the wire and prevents the wire from over-buckling while being heated. Such a feature is particularly advantageous when the welding torch system requires some time to readjust the preheating current in response to a change in the wire feed rate, particularly, a reduction in the wire feed rate. The temporary support of the wire by the dielectric tip renders a degree of "forgiveness" in time for the system to extricate itself from a potential jam-up. One of the keys to obtaining consistent preheating of the consumable electrode resides in the disposition of the bores through which the consumable electrode travels within each of those contact tips with respect to one another. Thus, for maximized electric contact consistency between the consumable electrode wire, and both the upper and lower electrode contact tips 15 and 17, the electrode contact tip bores should be displaced relative to each other. I have experimentally determined that the use of electrode contact tips which incorporate this concept maintain electrical contact consistency between the consumable electrode wire and the electrode contact tips to within approximately plus or minus 15 amperes variance of the desired current. Heretofore, electrode contact tips with coaxial bores experienced variances of up to plus or minus 100 amperes. Preferably, the upper electrode contact tip bore is in a generally "slanted" disposition and generally axially displaced relative to substantially straight bore of the lower electric contact tip. The orientation of the upper tip's bore 63 slanting plane and its displacement are always fixed relative to the bore of the lower tip, regardless of the rotation of these tips relative to each other. This, of course, assumes that both electric contact tips are aligned along a common axis. The aforesaid electrode contact tips are described in detail in my copending patent application Ser. No. 657,556 filed Oct. 4, 1984, entitled "Improved Apparatus for Electrically Isolated Hot Wire Surfacing Processes", the contents of which are incorporated herein by reference. It should be readily appreciated that a variety of configurations can be envisioned in which at least one of the channels through which the consumable electrode passes during the preheating stage is "slanted" relative to the axes defined by the disposition of the upper electric contact tip, the lower electric contact tip, and the dielectric member therebetween. It should be appreciated that in configurations in which both the upper electric contact tip and the lower electric contact tip include slanted channels or bores, the rotational disposition of the lower electrical contact tip relative to the upper electric contact tip will alter the relationship of the channels in each tip relative to each other.

Figure 4:
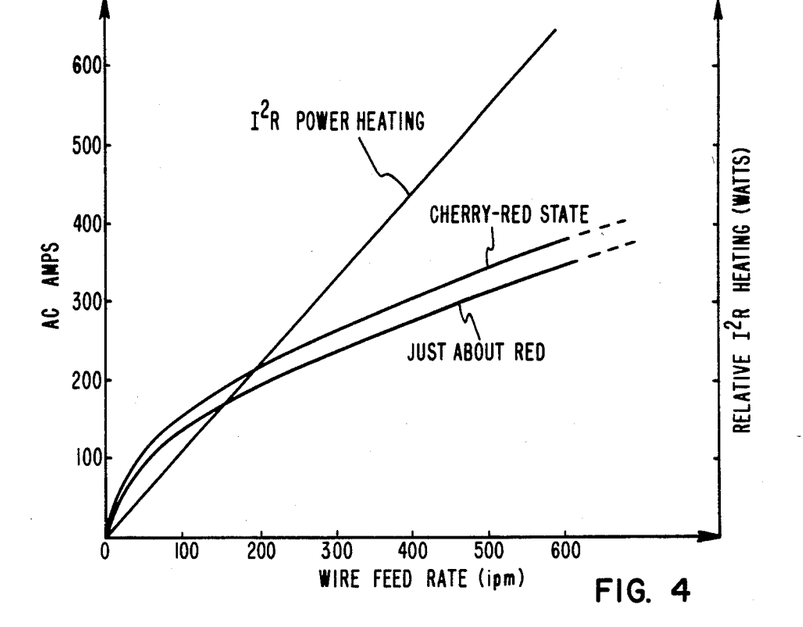
FIG. 4 is a graph illustrating the heating characterization curve for 1/16 inch Inconel 82 filler wire with a ½ inch dielectric gap between electrode contact tips.

I have theoretically and experimentally determined that all filler metals fed between two electric contact tips as described above can be characterized by a preheating current ($I_p$) versus wire feed rate (WFR) curves. The curves of all wires are identically shaped but they differ in value. FIG. 4 illustrates the curve that characterizes an Inconel wire. These curves determine the thermo and electromechanical limitations of the wire/tip combinations. For any given feed rate and length of wire, that is to say, the distance, l, between electric contact tips A and B, the rigidity is inversely proportional to the current ($I_p$) passing through it. The region enclosed by the "red" and "cherry-red" points as noted on the graph of FIG. 4 correspond to the softened condition of the wire. At this rate, due to the lower strength and rigidity, frequent wire feed difficulties are most likely to develop. Obviously, this region of difficulty must be avoided, and wire preheating must be kept below the "red" state. The present invention accomplishes this task through a concept for algorithmically controlling temperatures of the continuously fed wires. The implementation of the technique of this invention will furnish a self-adjusting wire reheating system that also maintains its desired temperature at any wire feed rate.

The $I_p$/WFR curve is illustrative of the $I^2R$ heating experienced by a conductor. The "leveling" of the curve at higher feed rates is attributed to its being a square root plot of the $I^2R$ function. The straight power plot generated by squaring the current at different wire feed rates confirms this fact. The curves themselves actually constitute temperature isotherms. In other words, each curve shows all the $I_p$/WFR combinations that yield the same thermal sate (temperature) of the wire.

Equation (1) predicts the average temperature of the preheated wire $$\Delta T = \frac{I_p^2 \times \rho \times l}{j \times C_p \times W.D \times A^2 \times WFR} \times (e^m) \tag{1}$$

where:
$I_p$=current through the wire (amperes)
$\rho$=average electrical resistivity at elevated temperatures ($\Omega$-m)
$l$=length of preheated wire or distance between the electric contact tips (cm., FIG. 1)
$j$=joules conversion factor (4.186 joule/calorie)
$C_p$=specific heat of wire alloy, (calorie/gr. °c)
W.D=alloy density (gr/cm$^3$)
$A$=wire's cross-sectional area (cm$^2$)
WFR=wire feed rate (cm/sec)

$\Delta T$ = wire temperature rise above ambient (°C.)
$T_o$ = ambient temperature, (°C.)
$T_i$ = temperature of concern (°C.)
$e^m$ = heat losses from the heated wire to the electric conduct tips and via conduction, radiation and convention Although the electric contact tips are made to be efficiently cooled, the heat losses from the hot wire into and through them is negligible and the $e^m$ term in Equation (1) can be assumed to equal 1. This is because:
1. The contact area between the hot wire and contact tip is very small (contact exists either about a line or few points on the wire).
2. Feed rates override the cooling rate experienced by the wire.
3. Wire-tip's/bore thermal resistance is very high.

For a given wire length (l), alloy and wire diameter Equation (1) can be rearranged so that all constants are grouped together as shown in Equation (2).

$$I_p = (j \times C_p \times W.D. \times A^2/\rho \times l)^{\frac{1}{2}} \times (WFR \times \Delta T)^{\frac{1}{2}} \quad (2)$$

$$\kappa' = (j \times C_p \times W.D. \times A^2/\rho \times l)^{\frac{1}{2}} \quad (3)$$

$$C = (j \times C_p \times W.D. \times A^2/l)^{\frac{1}{2}} \quad (4)$$

$$\kappa' = C/\sqrt{\rho} \quad (5)$$

$$I_p = \kappa' \times \Delta T^{\frac{1}{2}} \times WFR^{\frac{1}{2}} \quad (6)$$

$$M = \kappa' \rho \Delta T^{\frac{1}{2}} \quad (7)$$

$$I_p = M \times WFR^{\frac{1}{2}} \quad (8)$$

Figure 6:
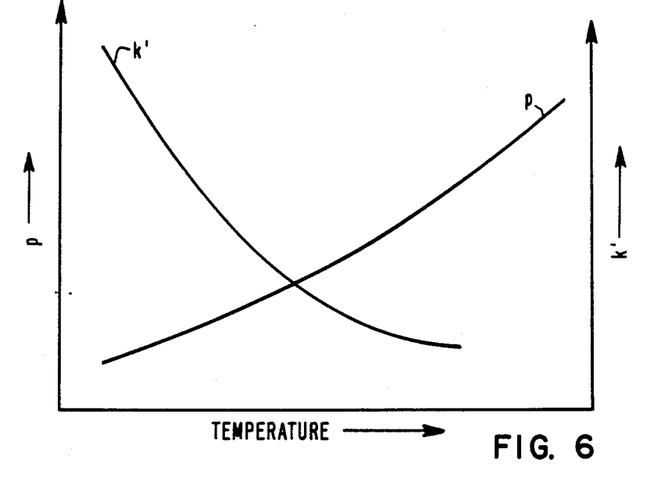
FIG. 6 is a graph illustrating the effects of temperature on electric resistivity.

Because the wire's electric resistivity ($\rho$) increases with temperature (FIG. 6) the $\kappa'$ value (Equations (5) and (6)) must decrease with temperature.

Use of Equation (6) as the basic algorithm to control the thermal state (temperature) of the preheated wire constitutes the basis of the present concept. The idea is to use the equation to instruct the preheating power supply as to what current ($I_p$) should it deliver, so that wire temperature is maintained constant at differing wire feed rates.

Figure 5:
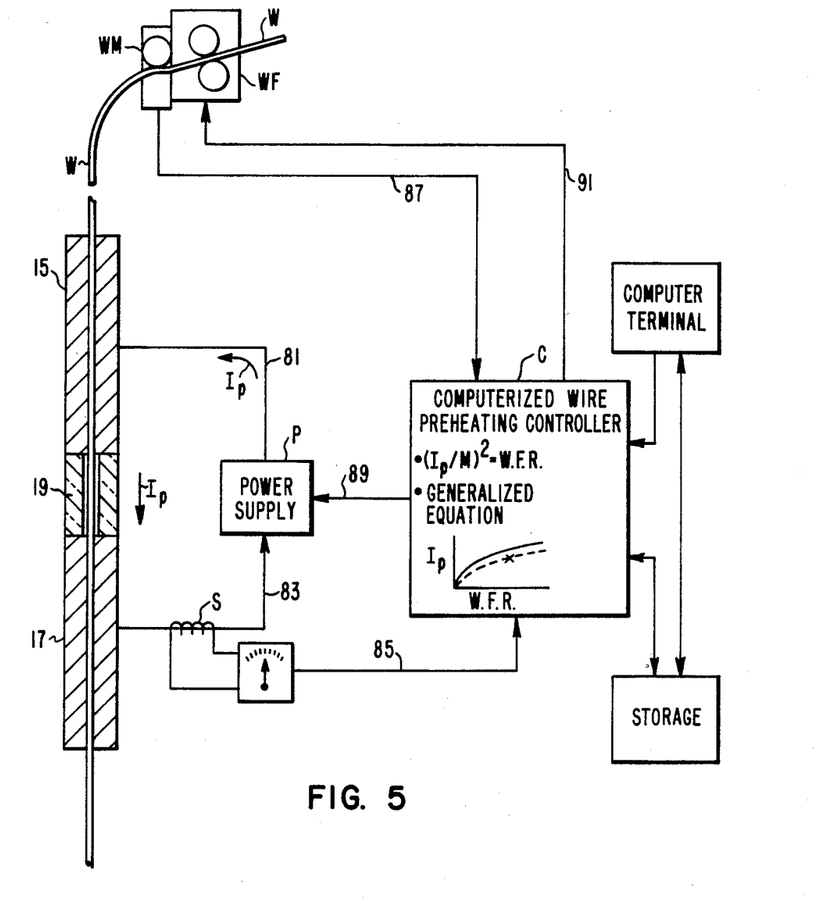
FIG. 5 is a functional flow chart of the wire preheating apparatus that implements the proposed concepts as illustrated in FIGS. 1, 2 and 3.

FIG. 5 diagrams the functional flow-chart of the wire preheating system that implements the proposed concept for algorithmically controlling the temperature of continuously fed wires.

A cold welding wire "W" is delivered to the upper electrode contact tip 15 for passage therethrough by means of a wire feeding system "WF" which can be a push type, pull type or push-pull type. A wire feed monitor "WM" rides directly on the wire "W" to provide exact wire feed rates to the computerized wire preheating controller "C". The wire "W" passes through the upper electrode contact tip 15, the lower tip 17 and the dielectric member 19. A power supply "P" is in communication with contact tips 15 and 17 via power supply lines 81 and 83. A current sensor "S" is provided to monitor the current flow to the contact tips from the power supply "P". Both current and wire feed rate data are conveyed to the computer "C" via lines 85 and 87 respectively. Communication from computer "C" to the power supply "P" is effected via line 89 in order to regulate the application of preheating power to the wire in accordance with the control algorithm to maintain a desired preheating wire temperature. The computer "C" preferably includes means for data storage and data programming capabilities incorporated therewith, so that specific information for a given torch or wire preheating characteristics can be entered into the control system. In the event of an emergency situation or the termination of a pre-programmed pre-heating operation, the computer "C" can effect a shut down of the wire feed means "WF" or a feed rate adjustment via line 91. The preheating wire controller or computer C is preferably interfaced with any associated welding control or robotic control systems associated therewith.

The methodology to implement the concept is best explained by steps below in conjunction with the several graphs of FIGS. 7A through 7F.

Figure 7A:
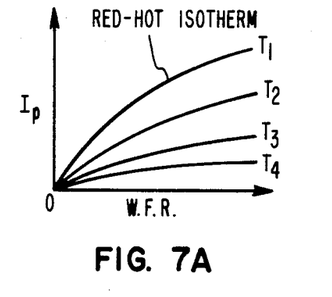
FIGS. 7A through 7F illustrate graphically the steps necessary to effect the technique of this invention.
Figure 7B:
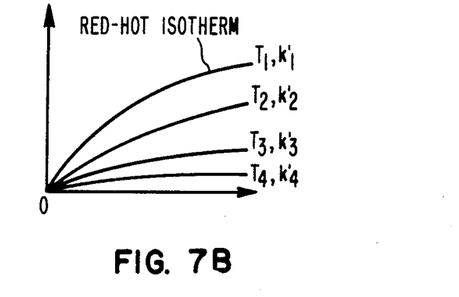
Figure 7C:
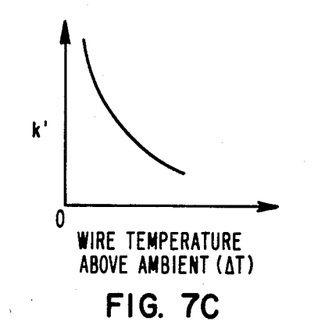
Figure 7D:
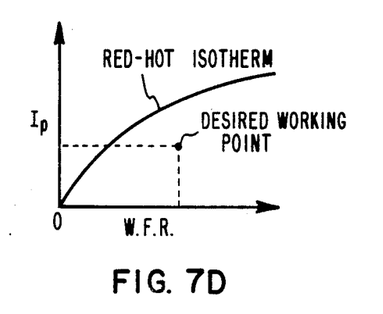
Figure 7E:
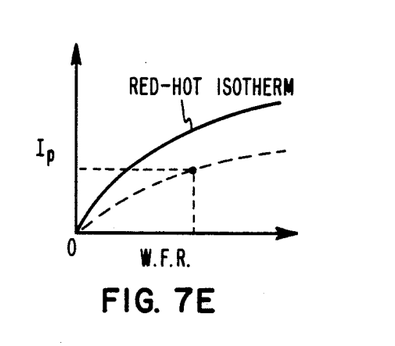
Figure 7F:
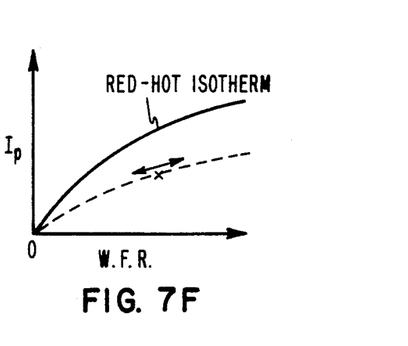

Step I: Experimentally determine the temperature isotherms for different $I_p$/WFR combinations. This is to be made on given:
  Alloy type
  Diameter of wire
  Combination of electric contact tips, A and B, (i.e., bore diameters and their geometrical relationship to each other, tips' material and length of dielectric tip (l)).
  Type of torch (i.e., type of tips' cooling, coolant type and flow rate).
  Surface type and condition of the wire (e.g., rough, smooth, copper coated, lubricated, etc.).

The method of determining these isotherms consists of measuring the average temperatures of the outcoming wire at known preheating currents ($I_p$) and wire feed rates (WFR). The temperature can be measured with the aid of non-contact optical devices such as calibrated spectrometers or single (or dual) color infrared radiometers (e.g., IRCON, Model 300T5C), focused on small spot(s) on the wire.

Step II: From the temperature isotherms determined in Step I and Equation (6), determine the $\kappa'$ values that yield the "most-fitting" plots for each isotherm. This can be accomplished by techniques such as simple data averaging regression analysis and/or least-square curve fitting.

Step III: From Step II plot wire's temperature rise above ambient ($\Delta T$) vs $\kappa'$ values. The ambient temperature can generally be assumed to be 25° C.

Step IVa: Using computerized curve-fitting techniques (such as regression), derive an equation that mathematically describes the relationship between $\Delta T$ and $\kappa'$.

$$\Delta T = C - A(\kappa' - b)^{1/m} \quad (9)$$

$$\kappa' = \frac{(C - \Delta T)^m}{A} + B \quad (10)$$

Substituting this relationship into Equation (6) either in terms of $\Delta T$ (when solving for $\Delta T$) or $\kappa$ (when solving for $\kappa'$) will yield a "generalized-equation" that accounts for all wire's thermal states at all $I_p$/WFR combinations, (Equations (11) and (12)).

$$I = \kappa' \sqrt{WFR \times [C - A(\kappa' - B)^{1/m}]} \quad (11)$$
(when solving for $\kappa'$)

$$\left[ \frac{(C - \Delta T)^m}{A} + B \right] \times WFR^{\frac{1}{2}} \times \Delta T^{\frac{1}{2}} \quad (12)$$
(when solving for $\Delta T$)

To derive the "generalized" equation for a 0.045 inch diameter, copper-coated A681 (mild steel) wire, Steps I through IVa were executed. The equation to be used as the controlling algorithm was found to be:

$$\Delta T = 497.97 - 951.14 \times \sqrt{\kappa' - 0.637014}$$

$$I_p = \left[\left(\frac{497.97 - \Delta T}{951.14}\right)^2 + 0.6374014\right]^2 \times \sqrt{WFR \times \Delta T}$$

Step IVb: Program the computer with either Equation (6) and the "generalized equation". For future use, this data could be recorded and stored on a floppy-disk, magnetic tape or punch card(s) (i.e., wire/process related "software").

Step V: Feed into the computer either:
A. The desired $I_p$/WFR working combination.
B. The deisred wire temperature at either a given preheating current ($I_p$) or wire feed rate (WFR).
C. The desired $\kappa'$ at either a given preheating current ($I_p$) or wire feed rate (WFR).

As soon as the preheating conditions are fed into the computer, the "generalized equation" programmed into it, will calculate either the $\kappa'$ or $\Delta T$ that corresponds to these conditions. The advantage of the "generalized equation" is the ability to dial into the system any of the combinations listed above and still have full accountability of the wire's thermal state (temperature). However, if knowledge of the wire's temperature is not "cared for", Equation (8) can be used in its "non-generalized" form. In this case, the desired $I_p$/WFR combination which is experimentally determined with a given wire would be dialed into the computer, and the corresponding (M) computed. With this constant, the equation will maintain the temperature isotherm whose value is known during the wire preheating operating.

Step VI: Once the $\kappa'$ or $\Delta T$ is determined, the algorithm (Equation (6) or the "generalized equation") will automatically "know" the temperature isotherm that corresponds to the desired preheating conditions.

Step VII: Activate the wire preheating operation. The preheating power supply will be instrumented to adjust its output current ($I_p$), in response to the wire preheating controller so that the wire's thermal state will be maintained constant in obedience to the "generalized-equation" describing the isotherm programmed into the computer in Step VI. The wire feed monitor, preferably an optical encoder, will continuously monitor the actual wire feed rate. The wire feed rate fed into the computerized wire preheating controller, as the independent variable, will be processed and used to regulate the preheating power supply in accordance with the control algorithm. The preheating current is the dependent variable.

Note: That when the "preheat of wire" is used in conjunction with the GMAW process, the proposed concept to control the preheats of the wire is applicable with either a constant potential (C.P.) welding power supply and/or constant wire feeding system or a constant current (C.C.) welding power supply and a variable wire feed rate system (such as used with aluminum welding to maintain a constant arc length. However, the wire preheating power supply always should be of the constant current (C.C.) type.

What has been described is a technique for the reliable control of the thermal state of the wire which is continuously fed and heated between two electric contact tips. This heating is achieved by passing electric current between the two tips and through the wire. The present wire heating arrangement for weld processes enables the electro-thermal "breakage" of the heretofore fixed relationship between heating sources and rebalances them in a fashion which presents to these processes highly desirable capabilities. The disclosed technique can of course be used in cladding, welding and brazing.

What is claimed is:

1. An apparatus for controlling the thermal state of a welding wire which is continuously fed and heated between two electric contact tips having a dielectric gap of a predetermined length therebetween, the heating being effected by electric current being passed between the two contact tips and through the wire, said apparatus comprising:

welding wire feed means for delivery of the welding wire to the electric contact tips;

welding wire feed rate monitor means for determining the welding wire feed rate and generating a first output signal reflective thereof;

power supply means in communication with the electric contact tips for delivering a controlled current to the electric contact tips;

current sensing means in communication with said power supply means for generating a second output signal reflective of the current provided by said power supply; and computer means responsive to said first output signal reflective of said wire feed rate and said second signal reflective of said current and generating a control signal to which said power supply is responsive in order to effect the application of current to the electric contact tips, said computer means being programmed with a predetermed series of temperature isotherms based on established welding wire characteristics such that for a desired average temperature for a welding wire of known composition, the appropriate level of preheating power is applied to the electric contact tips.

2. The apparatus according to claim 1 wherein the computer means is also in communication with the welding wire feed means to control the delivery of welding wire to the electric contact tips.

3. The apparatus according to claim 1 wherein the electric contact tips and the dielectric member each include a bore therethrough, throughout the welding wire passes and wherein the bore of at least one of the electric contact tips is axially displaced with respect to the bore of the other of said electric contact tips.

4. A method for controlling the thermal state of a welding wire which is continuously fed and heated between two electric contact tips having a dielectric gap of a predetermined value therebetween, said heating being effected by the passing of electric current between the two contact tips and through the wire, said method comprising the steps of:

characterizing the welding wire by establishing a preheating current vs wire feed rate curve, predetermining the average temperature of the outcoming wire at known preheating currents and known wire feed rates, and establishing a series of temperature isotherms based, at least in part, on the aforesaid preheating current vs wire feed rate curve;

feeding the welding wire to the electric contact tips, monitoring the wire feed rate to establish a first variable based on the feed rate;

applying a preheating current to the electric contact tips;

monitoring the preheating current to establish a second variable based on the preheating current; and controlling the application of the preheating current to render a preheated welding wire having a predetermined average temperature according to the temperature isotherms.

* * * * *